E. D. TROUTMAN.

CREDIT CABINET.

APPLICATION FILED JAN. 28, 1907.

Reissued Apr. 13, 1909.

12,942.

2 SHEETS—SHEET 1.

Witnesses

Sylvia Popon

J. A. Jeffers

Inventor

Edward D. Troutman

By

F. W. Bond

Attorney

E. D. TROUTMAN.

CREDIT CABINET.

APPLICATION FILED JAN. 28, 1907.

Reissued Apr. 13, 1909.

12,942.

2 SHEETS—SHEET 2.

Witnesses

Sylvia Boron.

J. A. Jeffers.

Inventor

Edward D. Troutman

By F. W. Bond

Attorney

UNITED STATES PATENT OFFICE.

EDWARD D. TROUTMAN, OF ALLIANCE, OHIO, ASSIGNOR, BY DIRECT AND MESNE ASSIGNMENTS, TO STEWART S. KURTZ, OF CANTON, OHIO.

CREDIT-CABINET.

No. 12,942. Specification of Reissued Letters Patent. Reissued April 13, 1909.

Original No. 781,698, dated February 7, 1905, Serial No 233,642. Application for reissue filed January 28, 1907. Serial No. 354,586.

*To all whom it may concern:*

Be it known that I, EDWARD D. TROUTMAN, a citizen of the United States, residing at Alliance, in the county of Stark and State of Ohio, have invented certain new and useful Improvements in Credit-Cabinets; and I do hereby declare that the following is a full, clear, and exact description of the same, reference being had to the annexed drawings, making a part of this specification, and to the figures of reference marked thereon, in which—

Figure 2:
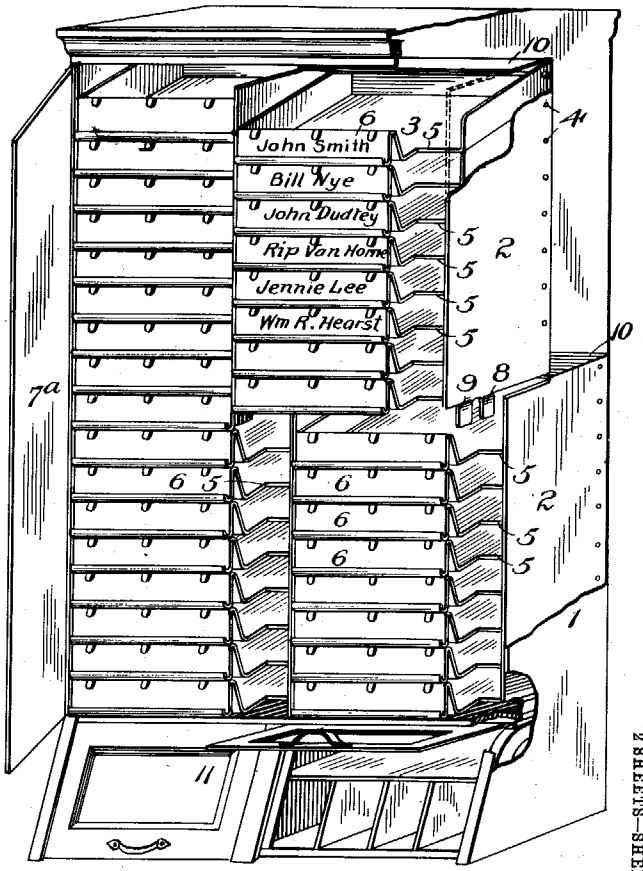
Figure 1:
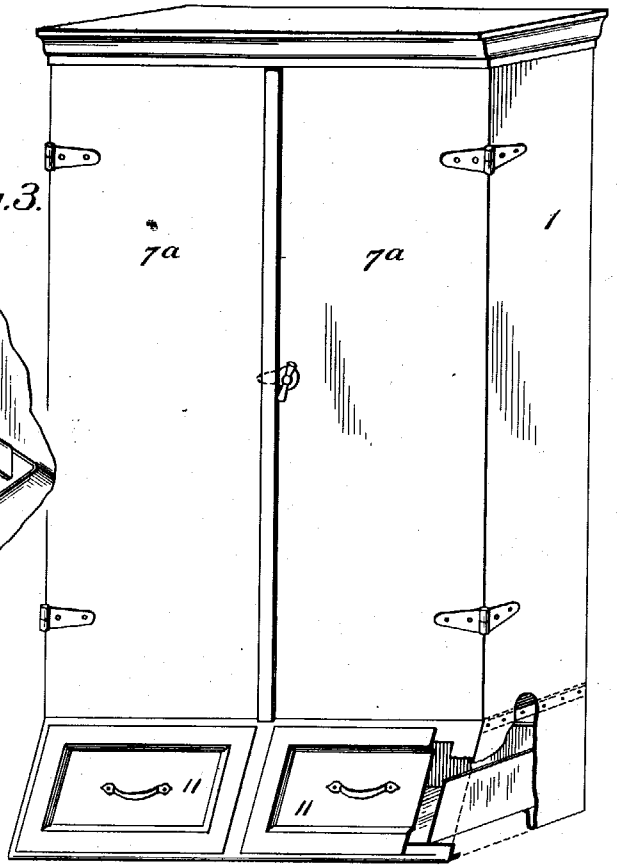
Figure 3:
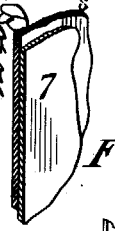
Figure 4:
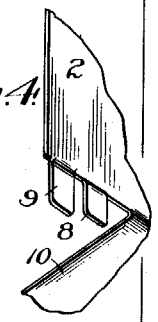
Figure 5:
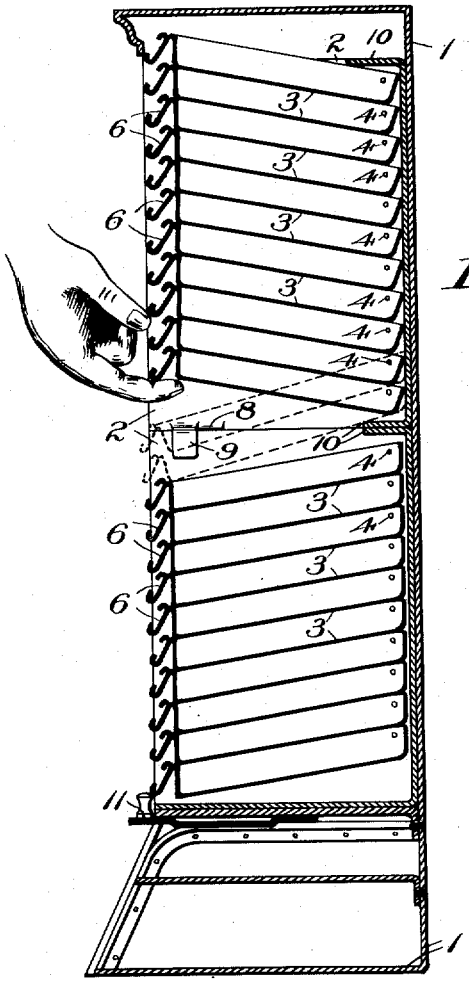

Figure 1 is a view of the cabinet closed. Fig. 2 is a view showing the front portion of the cabinet and illustrating the tray-sections, showing one of the sections partially removed from the casing. Fig. 3 is a view showing a portion of the outer casing and the asbestos lining. Fig. 4 is a view showing one corner of one of the tray-sections and illustrating the position of the connecting clips. Fig. 5 is a vertical section of the outer casing and the inner tray section and illustrating a number of the upper trays elevated or turned upon their pivotal points.

The present invention has relation to credit cabinets; and it consists in the novel construction hereinafter described, and particularly pointed out in the claims.

Similar numerals of reference indicate corresponding parts in all the figures of the drawings.

In the accompanying drawings, 1 represents the outer case, which is constructed of any desired size, reference being had to the number of tray-sections designed to be placed in the casing proper. The tray sections or casings 2 are formed of such a size that they can be conveniently handled for the purpose of removing the same from the casing proper or placing the same in the casing after they have been removed. The purpose of providing tray sections that can be removed from the casing 1 is to provide a means for placing the tray-sections, together with their trays and the credit-slips contained in said trays, in a safe or vault to provide suitable fire protection.

The tray-sections 2 are provided with any desired number of trays 3, which trays are located in the tray-sections, substantially as shown in the drawings, and, as shown, they are inclined downward, so that their front ends will be lower than the rear ends, by which arrangement the credit-slips will slide toward the front or forward ends of the trays. The trays are held in proper position with reference to their section by means of the connecting rivets 4, which rivets are located at the rear upper corners of each tray 3, as illustrated in Fig. 2. By providing the rivets 4 the trays 3 are pivotally attached to their casings 2, so that the outer ends of the trays can be lifted upward one at a time, or any desired number of trays may be lifted at a single time, as, for instance, if it is desired to lift all of the trays upward at their front ends except the lower one all of the trays directly above the lower one are moved upward by lifting the one next to the bottom or lower tray, as it will be understood that the trays above the one lifted will be carried upward, each riding upon the next lower tray. It will be understood that, if desired, the lower tray may be lifted; but this is not, as a rule, necessary, owing to the fact that no tray containing credit-slips is to be located below the lowermost pivoted tray.

Each tray section 2, in reality, comprises a supporting frame for a series of trays and a series of trays, each of which at its rear end, is pivotally connected to the frame. The mounting of the individual trays of the series upon a frame independent of the main casing 1, and readily inserted into or removed from the latter, facilitates the assembling of the trays in the series, besides greatly simplifying the replacement in the series of a tray, should this for any reason become necessary. With a cabinet constructed in accordance with my invention, a tray series may be bodily removed from the outer casing without in anywise disturbing the construction of the casing, and the trays of the series will remain connected to the tray casing or supporting frame in fixed relation to each other.

For the purpose of exposing to view the credit-slips the right-hand corners of each tray 3 are cut away, so as to provide the cut-out portions 5 and the tablet-holding flanges 6, located at one side of the cut-out portions 5.

For the purpose of providing temporary fire protection the casing 1 is provided with the asbestos lining 7, which asbestos lining is located upon the inner sides of the casing 1, and at the same time the doors 7[a] may be lined upon their inner sides with asbestos. In the drawings I have illustrated two doors; but this is simply conventional, as it will be understood that a single door may be employed without departing from the nature of my invention.

For the purpose of holding the sections 2 in proper relative position the lower ends of the upper tray-sections are provided with the tangs 8 and 9, which tangs come upon opposite sides of the side members of the tray-sections 2.

In Fig. 2 I have illustrated one of the upper tray sections partially removed from the casing 1 to illustrate the manner of removing the tray sections from the outer casing.

It will be understood that the tops and bottoms 10 of the tray-casings 2 should be of less width than the sides, by which arrangement the tangs 8 and 9 are permitted to come upon opposite sides of the side members 2.

It will be understood that by forming the tops and bottoms of adjacent tray-sections of a width less than the length of trays, and by normally inclining the trays downward said trays can be lifted upward as indicated in the drawings. It will also be understood that the lifting of the trays can be accomplished without regard to the number of tray-sections, owing to the fact that the tops and bottoms 10 are set back.

The lower portion of the casing 1 may be so formed that it will constitute a base for the support of the casing proper and may be provided with suitable doors, such as 11, which doors may be either hinged or arranged to slide back after they have been lifted up. This forms no particular part of the present invention, and no detailed description is deemed necessary.

Having fully described my invention, what I claim as new, and desire to secure by Letters Patent is:—

1. In a credit-cabinet, the combination of an outer casing and a series of tray-sections located therein and detachably connected together, each of said tray-sections being provided with trays pivotally connected thereto at their rear ends and inclined downward toward their forward ends, substantially as and for the purpose specified.

2. In a credit-cabinet, the combination of an outer casing and a series of tray-sections located therein and detachably connected together, each of said tray-sections being provided with trays pivotally connected thereto at their rear ends and inclined downward toward their forward ends and said trays located in contact with each other, substantially as and for the purpose specified.

3. In an account cabinet, the combination of a series of superposed sheet metal trays, all of the same size and shape, each of said trays having bottom and front walls, and each tray inclined downward toward its front end and having a bottom wall forming a substantial closure for the tray beneath it, a supporting frame for the series of trays, means for tiltably supporting each of said trays in said supporting frame, and an outer casing arranged to receive and hold in position said supporting frame and tray series with only the front ends of the said trays exposed to view, whereby access to any tray of the series for the purpose of placing therein or withdrawing therefrom a slip is obtained only by lifting the tray above the one to which access is desired.

4. In an account cabinet, a tray section comprising a supporting frame, a series of superposed sheet metal trays all of the same size and shape, each of said trays having bottom, front, and side walls, and each tray pivotally connected at its rear end to said supporting frame and inclined downward toward its front end, the bottom wall of each tray forming a substantial closure for the tray beneath it, and an outer casing having vertical side and rear walls, said casing arranged to receive and hold in position said tray section with only the front ends of the trays of said section exposed to view, whereby access to any tray of the series for the purpose of placing therein or withdrawing therefrom a slip is obtained only by elevating the tray above the one to which access is desired.

In testimony whereof I have signed my name to this specification in the presence of two subscribing witnesses.

EDWARD D. TROUTMAN.

Witnesses:

MINA B. UBELHART,

N. A. ERNST.